US011687505B2

(12) United States Patent
Liao et al.

(10) Patent No.: US 11,687,505 B2
(45) Date of Patent: Jun. 27, 2023

(54) SELF-ADAPTIVE COPY RETENTION MANAGEMENT

(71) Applicant: EMC IP Holding Company LLC, Hopkinton, MA (US)

(72) Inventors: Mengze Liao, Shanghai (CN); Scott Quesnelle, Burlington (CA); Yasemin Ugur-Ozekinci, Oakville (CA); Jin Ru Yan, Shanghai (CN); Mike Xiaoliang Zhu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 83 days.

(21) Appl. No.: 17/236,397

(22) Filed: Apr. 21, 2021

(65) Prior Publication Data

US 2022/0342858 A1 Oct. 27, 2022

(51) Int. Cl.
*G06F 16/21* (2019.01)
*G06F 16/215* (2019.01)
*G06F 11/14* (2006.01)

(52) U.S. Cl.
CPC ........ *G06F 16/215* (2019.01); *G06F 11/1448* (2013.01); *G06F 2201/80* (2013.01)

(58) Field of Classification Search
CPC . G06F 16/215; G06F 11/1448; G06F 2201/80
See application file for complete search history.

(56) References Cited

U.S. PATENT DOCUMENTS

2017/0010941 A1* 1/2017 Shimada ................. G06F 11/00
2020/0241757 A1* 7/2020 Lee ....................... G06F 3/0673

* cited by examiner

*Primary Examiner* — Apu M Mofiz
*Assistant Examiner* — Cindy Nguyen
(74) *Attorney, Agent, or Firm* — Staniford Tomita LLP

(57) ABSTRACT

A current retention mode is identified as being one of conservative or aggressive. When the retention mode is identified as aggressive, a check is made as to whether used space on backup storage is below a lower threshold. If the used space is below the lower threshold, a switch is made into the conservative mode. If the used space is above the lower threshold, the aggressive mode is maintained. While in the aggressive mode, a backup chain of a database is selected for pruning, the selected backup chain having a shortest retention term of all backup chains not yet pruned and not being a latest backup chain. Log backups of the database in the selected backup chain are identified. Each log backup that has expired is deleted regardless of dependency of other backups on an expired log backup.

18 Claims, 11 Drawing Sheets

SELF-ADAPTIVE COPY RETENTION MANAGEMENT

TECHNICAL FIELD

The present invention relates generally to information processing systems, and more particularly to copy retention management.

BACKGROUND

Data retention refers to retaining copies of data for purposes of backup, legal, and other requirements. One problem with retention management is that certain types of data structures such as databases can have very complex dependency chains between different copy types. For example, there exist techniques to make a full backup copy of a database followed by multiple partial or non-full backups of the database. These partial or non-full backups can generally be completed faster than full backup operations and generally require less storage space. Nonetheless, they still require storage space and the space requirements can grow dramatically over time as copy after copy is made.

Maintaining copy after copy in a storage system can increase storage system cost, degrade overall performance of the storage system, and reduce the space available for current backup operations. The complex dependency between copy types coupled with the need to maintain various recovery points and balance storage costs makes retention management an extremely difficult task.

Therefore, there is a need for improved systems and techniques for copy retention management.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
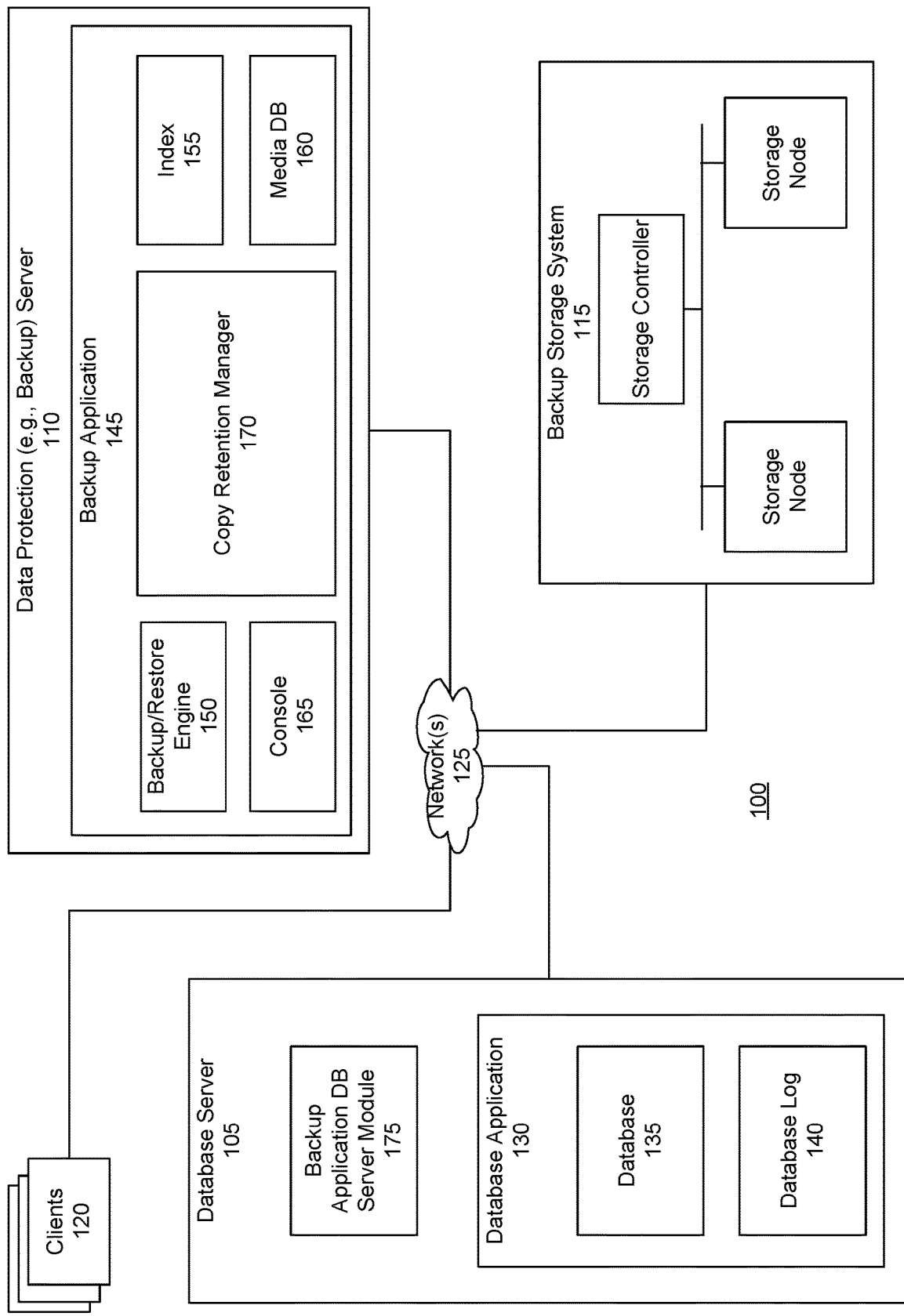
FIG. 1 shows a block diagram of an information processing system comprising a self-adaptive copy retention management system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

FIG. 1 shows a simplified block diagram of an information processing system 100 for self-adaptive copy retention management, according to one or more embodiments. Many organizations rely on data protection systems to create and store secondary or backup copies of data for a certain period of time. These copies may be for purposes of disaster recovery or to comply with data retention regulations. Retaining copy after copy, however, can overwhelm an organization's storage resources, increase storage costs, prevent current backup jobs from completing, and degrade storage system performance.

The period or length of time for which a copy should be retained may be referred to as a retention time, duration, or term. When the retention term for a copy has elapsed or passed, the copy can be considered to have expired. When a copy has expired, it is desirable to prune or otherwise delete or remove the copy from storage to free space for other copies and remain within capacity licensing agreements that a customer organization may have with a vendor of the data protection system. The potential presence, however, of different backup levels, copy types, and complex dependencies among different copies, coupled with competing demands to maintain different recovery point objectives (RPOs) including short and long term retention goals, satisfy data retention regulations, and remain within available storage or capacity licensing agreements makes retention management a daunting task. In an embodiment, systems and techniques are provided to help an organization manage copy sprawl involving complex dependencies, balance short and long term retention goals, and remain within available storage or licensed capacity.

The example shown in FIG. 1 includes a database server 105, data protection (e.g., backup) server 110, backup storage system 115, clients 120, and network 125 connecting the database server, backup server, clients, and backup storage system to each other.

The clients may include work stations, desktop computers, laptops, servers, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The database server includes a database application 130 having a database 135 and database log 140. The database application may be part of a relational database management system (RDBMS). Some examples of relational database management systems include SQL Server® as provided by Microsoft Corporation of Redmond, Wash.; Oracle® as provided by Oracle Corporation of Austin, Tex.; SAP HANA® as provided by SAP SE of Germany; and others. A database application allows for creating, updating, and maintaining a database. A database is data structure that stores organized information. Most databases include multiple tables, each of which may include multiple fields. For example, a company database may include tables for products, employees, and financial records. Each of these tables may have different fields that are relevant to the information stored in a respective table. Clients can access and modify the information stored in the database using Structured Query Language (SQL) commands.

Modifications to the database may be referred to as transactions. The transactions may be stored in the database log. A transaction issued by a client and received at the database server may first be written from memory to the database log and then later committed to the database. The database log records information about each transaction executed on the database. For example, a record of a transaction in the database log may include a transaction identifier (ID), a timestamp indicating when the transaction was committed to the database, and the changes made to the database. The log file can be very useful as they allow for rolling back or reconstructing the database to previous points in time by replaying the log file.

The backup server includes a backup application 145. The backup application includes a backup/restore engine 150, index 155, media database 160, console 165, and copy retention manager 170. The backup engine is responsible for backing up the database system including the database itself, database log, or both to the backup storage system so that there are one or more secondary or duplicate copies. The backup application may include a backup application database server module 175 that coordinates with the backup application to backup the database, database log, or both to the storage system.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. An example of a suitable storage system includes Data Domain® as provided by Dell EMC of Hopkinton, Mass. Data Domain is an inline deduplication storage system that offers scalability and protection storage for backup, archive, long-term cloud retention, and disaster recovery. While some embodiments are discussed in conjunction with the Data Domain® product, it should be appreciated that aspects and principles of the systems and techniques described herein can be applied to other storage systems provided by other vendors.

In an embodiment, the storage (e.g., tape or disk array) may represent any practical storage device or set of devices, such as tape libraries, virtual tape libraries (VTL), fiber-channel (FC) storage area network devices, and OST (Open-Storage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage may represent logical storage that includes any number of physical storage devices connected to form a logical storage.

The index provides a catalog of the various backups and backup copy types of the database that are available for restore. In an embodiment, the index records metadata about the different backups including, for example, information identifying a copy type of a particular backup copy (e.g., full, cumulative/incremental, differential, or log), dependency information identifying one or more other copies that are dependent on the particular copy, a backup chain to which the particular copy belongs, a time and date at which the particular copy was created, a retention term associated with the particular copy, and other metadata. Further discussion is provided below.

The media database tracks the location at which the backup copies are stored. The console provides a user interface (UI) to the backup application. The console allows a user to browse the index of backups and configure the backup application such as specifying a backup schedule, type of backup to perform, set retention polices, configure conservative and aggressive retention management modes, define storage space thresholds, and configure other options and settings.

The copy retention manager is responsible for monitoring backup storage space and identifying backup chains and copy types within a backup chain to delete when storage capacity reaches certain threshold levels. The copy retention manager provides two modes of retention including an aggressive retention mode and a conservative retention mode and an automatic switching between the aggressive and conservative retention modes based on storage or capacity licensing thresholds. The conservative retention mode preserves a greater number of copies as compared to the aggressive retention mode. In other words, during the aggressive retention mode a greater number of copies will be deleted or removed from storage as compared to the conservative retention mode. The copy retention manager, based on used (or available) storage space, can automatically switch from the conservative retention mode into the aggressive retention mode (or switch from the aggressive retention mode to the conservative retention mode). This helps to preserve many different recovery options or recovery points when a large amount of storage space is available, yet also helps to ensure that the organization does not maintain an excessive number of copies when there is a lesser amount of storage space available. The copy retention manager helps an organization efficiently manage storage costs while also providing good protection against critical data loss and multiple recovery point objectives.

The backup application supports multiple backup levels or copy types for the backups of the database. Such backup levels or copy types may include full backups and non-full or partial backups including cumulative or incremental backups, differential backups, and log or log-only backups. A full backup may back up all the data including the database data itself and database transaction log. A cumulative or incremental backup may back up only the data that has changed since a last backup of any type. A differential backup may back up only the data that has changed since a last full backup. A log or logs-only backup backs up only the transaction log.

Each backup copy type offers different advantages. For example, a full backup results in a complete copy of the entire database and allows for a fast recovery time. A full backup, however, can require more time to complete and require more storage space as compared to other copy types. A cumulative backup may be completed faster than a full backup. Recovering from cumulative backups, however, may require more time than recovering from a full backup because multiple cumulative backups may need to be applied during a recover operation. An organization may employ a mix of different copy types when deciding upon a backup strategy in order to balance recovery time objectives, desired backup window durations, and available storage space.

For example, an organization may specify a backup strategy as having weekly full backups, log backups every 15 minutes, hourly differential backups, and daily cumulative backups. A typical backup strategy can result in a very complex dependency chain between different copies and copy types.

Figure 2:
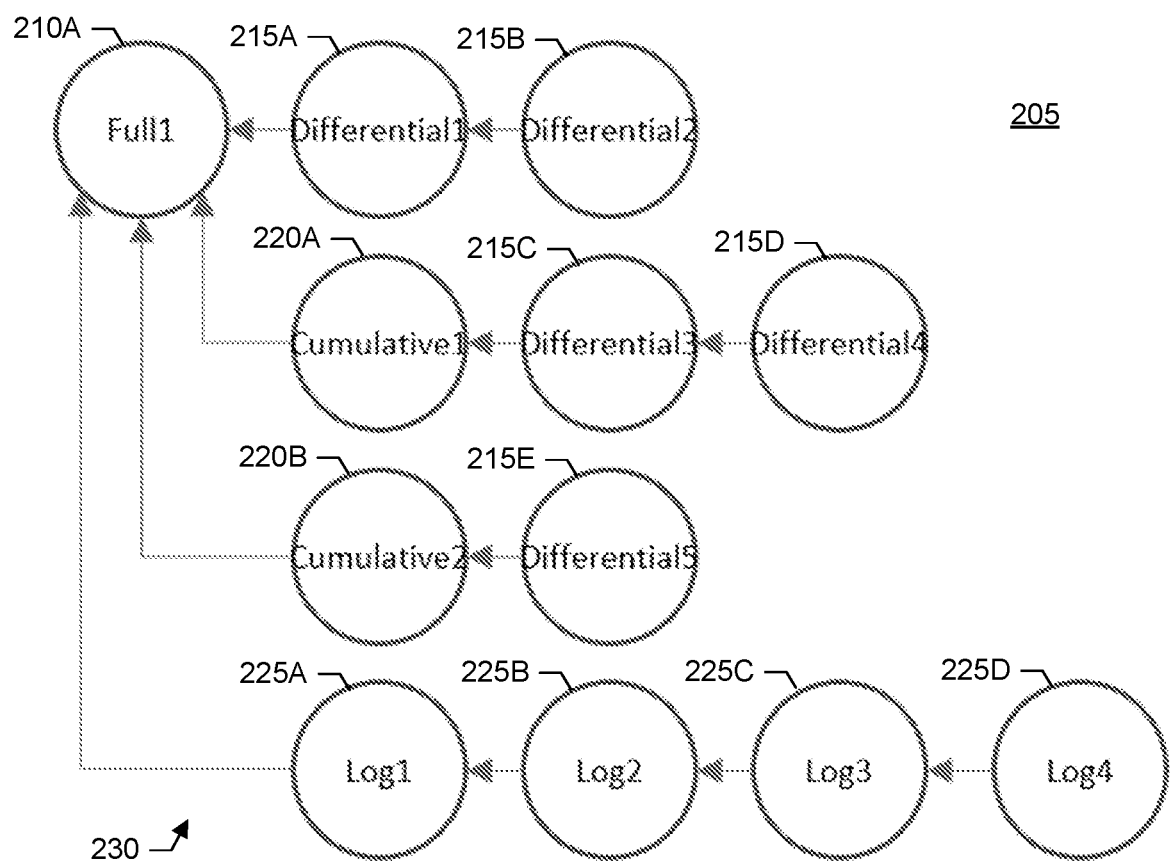
FIG. 2 shows an example of a copy dependency chain, according to one or more embodiments.

For example, FIG. 2 shows a tree structure of a backup chain 205 for a database. A backup chain may be referred to as a copy chain. The backup chain shown in FIG. 2 includes a full backup 210A, differential backups 215A-E, cumulative backups 220A-B, and log backups 225A-D.

Figure 3:
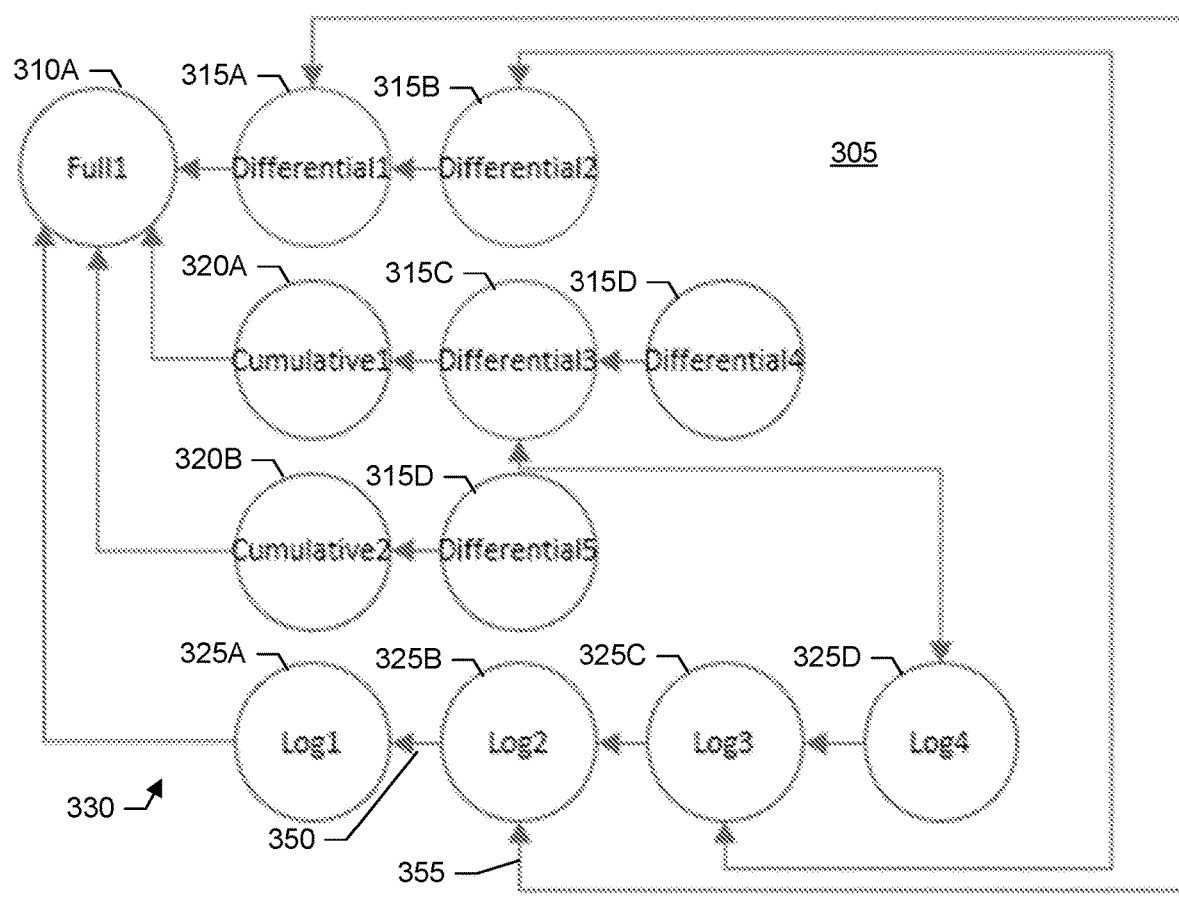
FIG. 3 shows another example of a copy dependency chain, according to one or more embodiments.

FIG. 3 shows a graphic structure of a backup chain 305 for a database. The backup chain shown in FIG. 3 includes a full backup 310A, differential backups 315A-E, cumulative backups 320A-B, and log backups 325A-D.

Figure 4:
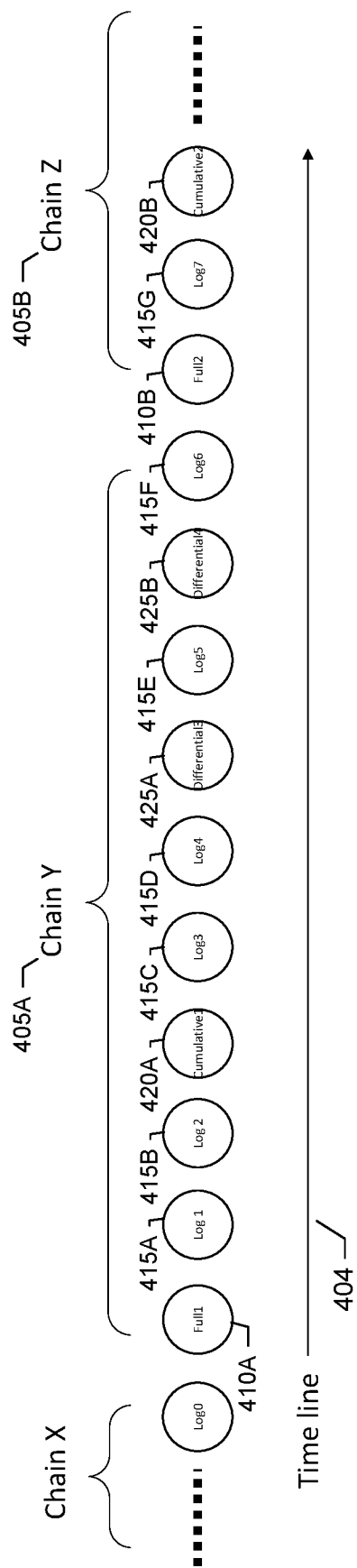
FIG. 4 shows a timeline along which copy chains and copy types within a copy chain are created, according to one or more embodiments.

FIG. 4 shows a timeline representation of a series of ongoing backup chains and copy types within each particular backup chain. As shown in the example of FIG. 4, an arrow 404 indicates a timeline. A first backup chain 405A (backup chain Y) includes a full backup 410A, followed by a log backup 415A, followed by a log backup 415B, followed by a cumulative backup 420A, followed by a log backup 415C, followed by a log backup 415D, followed by a differential backup 425A, followed by a log backup 415E, followed by a differential backup 425B, followed by a log backup 415F.

A second backup chain 405B (backup chain X), after the first backup chain, includes a full backup 410B, followed by a log backup 415G, followed by a cumulative backup 420B, and so forth. Thus, a backup or copy chain may be defined as including a single full backup followed by multiple partial backups (e.g., cumulative/incremental, differential, or log).

A backup or copy chain may be associated with a retention time or term. Different copy chains can have different or the same retention terms. For example, consider that there are first, second, third, fourth, and fifth copy chains. The first, second, third, fourth, and fifth copy chains are associated with first, second, third, fourth, and fifth retention terms, respectively. A duration or length of the first retention term may be different or the same as a duration of the second, third, fourth, or fifth retention terms. A duration of the second retention term may be different or the same as a duration of the third, fourth, or fifth retention terms. A duration of the third retention term may be different or the same as a duration of the fourth or fifth retention terms. A duration of the fourth retention term may be different or the same as a duration of the fifth retention term. For example, the duration of the first retention term may be greater than a duration of the second, third, fourth, or fifth retention terms. The duration of the first retention term may be less than a duration of the second, third, fourth, or fifth retention terms. Different copies may have the same retention term, but different expiration dates based on the time or day that a copy was created. For example, a retention term for a log copy may be specified as one week. In this example, consider that a first log copy or backup is created on Monday of a first week, and a second log copy or backup is created on Tuesday of the first week. The first log copy would thus expire on Monday of a second week, following the first week. The second log copy would expire on Tuesday of the second week.

Different retention terms allow an organization to meet different goals or purposes for retaining data. For example, some copy chains and associated retention terms may be to provide the organization with the ability to recover business critical data in the event of a site-wide data loss or to recover from an accidental deletion. Other copy chains and associated retention terms may be to comply with state and federal regulations. Different states may require different retention periods. Federal retention periods may differ from state retention periods. Different types of documents or business units may have retention requirements that differ from retention requirements of other document types or business units.

For example, an organization may design a data retention policy that specifies weekly copy chains are to be retained for a week, but copy chains that happen to be created at a beginning of each month are to be retained for two years. A copy chain having a retention duration that is greater than all other copy chains may be designated as a longest term retention chain. A copy chain having a retention duration that is less than all other copy chains may be designated as a shortest term retention chain. A most recently created copy chain may be designated as a latest copy chain. Copy chains may be ordered or ranked according to their retention terms. This helps to facilitate determining whether a particular copy chain can be considered to have a shorter or longer retention term relative to other copy chains.

Referring back now to FIGS. 2 and 3, arrows 230 and 330, respectively, indicate the dependency chain among the different copies. A dependent chain means that a first copy (copy A) depends on a second copy (copy B) such that if the second copy (copy B) is deleted, then the first copy (copy A) is not restorable.

Figure 5:
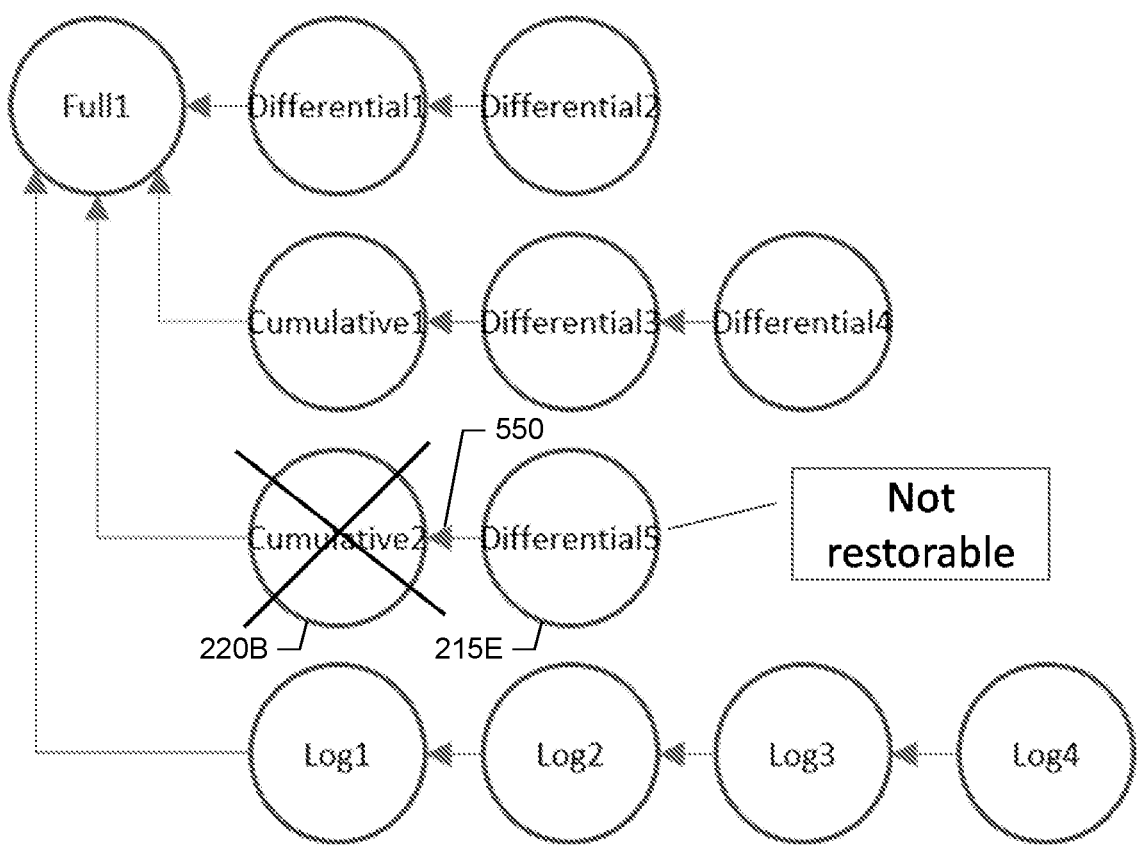
FIG. 5 shows an example of deleting a copy from a dependency chain, according to one or more embodiments.

For example, FIG. 5 shows backup chain 205 from FIG. 2. An arrow 550 indicates that differential backup 215E (differential 5) depends on cumulative backup 220B (cumulative 2). If cumulative backup 220B is deleted (as indicated by an "X" superimposed on cumulative backup 220B), differential backup 215E would not be restorable.

Different database applications can have different dependency chains. For example, referring back now to FIG. 3, an arrow 350 indicates that log backup 325B (log 2) depends on log backup 325A (log 1). An arrow 355 indicates that log backup 325B (log 2) depends on differential backup 315A (differential 1). Log backup 325B (log 2) depends on log 325A (log 1) or differential backup 315A (differential 1). Thus, if log backup 325A (log 1) is deleted, log backup 325B (log 2) can be restored from differential backup 315A (differential 1). If log backup 325A (log 1) and differential backup 315A (differential 1) are both deleted, log 2 would not be usable.

In some cases, an organization may desire a conservative approach to copy retention management. Under a conservative retention management, the retention manager of the backup application maintains the dependency chain and is not allowed to break the chain when deleting expired copies. In an embodiment, a conservative retention management mode deletes a copy only after all dependent copies are expired. In other words, if there is no other copy in a copy chain that depends on the expired copy, the expired copy will be deleted. If there is another unexpired copy in the copy chain that depends on the expired copy, the expired copy is kept. If the expired copy and all dependent copies are all expired, the copies on the dependency chain can be deleted.

However, even under a conservative retention management approach, there may be cases when the organization may desire an aggressive approach to retention management. There can be many cases where a customer may want to delete copies aggressively. Such cases may be found where the backup storage system is almost full or a licensed capacity is about to be reached. A lack of sufficient storage space can result in new or current backups not being able to complete. Exceeding licensed capacity can result in increased storage costs or other fees. Licensed capacity may be measured using a capacity metric such as a number of terabytes (TBs) licensed (e.g., 10, 20, 30, 40, or 50 TB license). A customer may wish to control the cost of storage by, for example, aggressively deleting copies while limiting the number of remaining unrestorable copies. Requiring a customer to manually delete copies has many drawbacks.

In particular, the vast number of copies that may be created every day makes manual deletion impracticable. It can be difficult to understand which copies can be deleted while limiting the number of unrestorable copies in a backup chain as there can be very complex dependencies. There can be difficulties in controlling the space to be freed after deletion. Accidentally selecting and deleting the wrong copy can be disastrous. For example, simply deleting a copy immediately when the copy is expired without considering the dependency chain can easily break a whole copy chain and make many other copies in the copy chain unrestorable. Deletion of a copy or breaking a copy chain may render a long term retention (LTR) copy unusable. There is difficulty in controlling the space to be freed as different types of copies consume different amounts of storage space.

In an embodiment, the retention manager provides an intelligent method of aggressive retention management. In an embodiment, systems and techniques provide retention-based copy chain selection. In this embodiment, a shortest term retention chain is identified as being a first priority to be selected as aggressive retention management. The reason is because a longest term retention copy may be considered to contain the most important historical data for regulation and other purposes. A next longer term retention chain may be selected as a second priority, and so forth. In this embodiment, a latest chain is not selected because it may be considered to have the most important recovery points since it represents a most recent backup.

In an embodiment, systems and techniques provide for copy type-based selection in each chain. In this embodiment, log copies are identified as being the first priority to be selected for aggressive deletion. Log copy types are selected over other copy types because the deduplication ratio of a log copy is low as compared to the other copy types (e.g., differential, cumulative or incremental). Further, the number of log copies in a copy chain is generally much greater as compared to the number of other copy types in the copy chain. For example, consider a backup strategy for a database as having weekly full backups, daily cumulative backups, and log backups every 15 minutes. In this example, a weekly copy chain may include a single full backup, 7 cumulative backups, and 672 log backups (10,080 minutes per week/15 minutes=672 log backups). Thus, aggressively removing the log copy types is generally the most helpful for freeing space. Full copy types are not selected for aggressive deletion.

Figure 6:
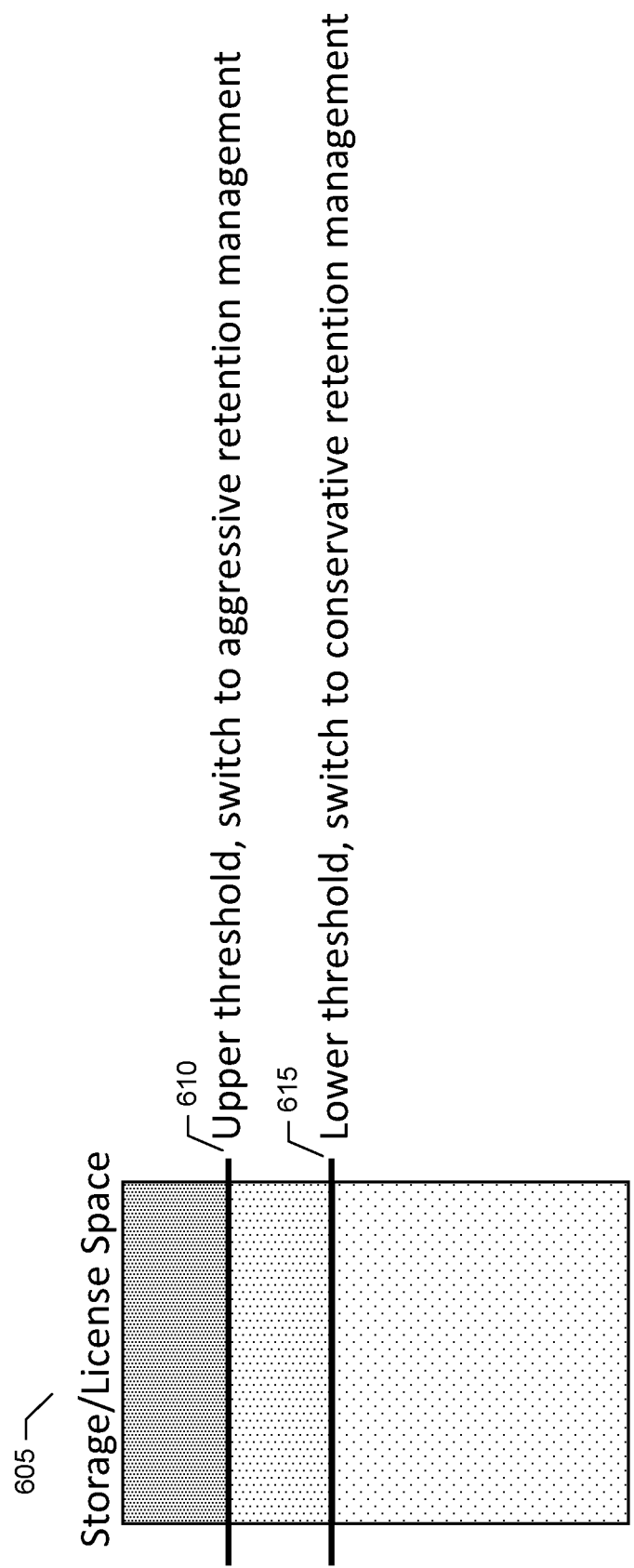
FIG. 6 shows upper and lower thresholds for switching between aggressive and conservative retention management modes, according to one or more embodiments.

FIG. 6 shows a bar graph representing backup storage system space 605. In an embodiment, there is a threshold-based auto-switch between conservative and aggressive retention management. In an embodiment, auto-switching between conservative and aggressive retention management modes is a user-configurable option. In this embodiment, a technique includes defining an upper threshold 610. If the storage used goes beyond the upper threshold of available storage or licensed capacity, the retention manager switches to the aggressive retention management. The technique includes defining a lower threshold 615. If the storage used is below the lower threshold of available storage or the licensed capacity, the retention manager switches to the conservative retention management. The lower and upper thresholds may be expressed as percentage values of the storage or licensed capacity. The lower and upper thresholds are defined such that the lower threshold is less than the upper threshold. In other words, the upper threshold is greater than the lower threshold. For example, the lower and upper thresholds may be defined as being 75 percent and 90 percent, respectively, of capacity.

The use of two different thresholds helps to prevent the ping-ponging or constant shifting between the conservative and aggressive retention management modes. In an embodiment, the switch from conservative to aggressive or vice-versa includes generating a notification to alert a customer user about the switch in retention modes. Having two different thresholds helps to provide a good customer or user experience by limiting the frequency of switches and thus notifications that may make the product behavior appear unstable. In another embodiment, however, there can be a single threshold. A single threshold may be implemented by setting the lower and upper thresholds equal to each other.

Figure 7:
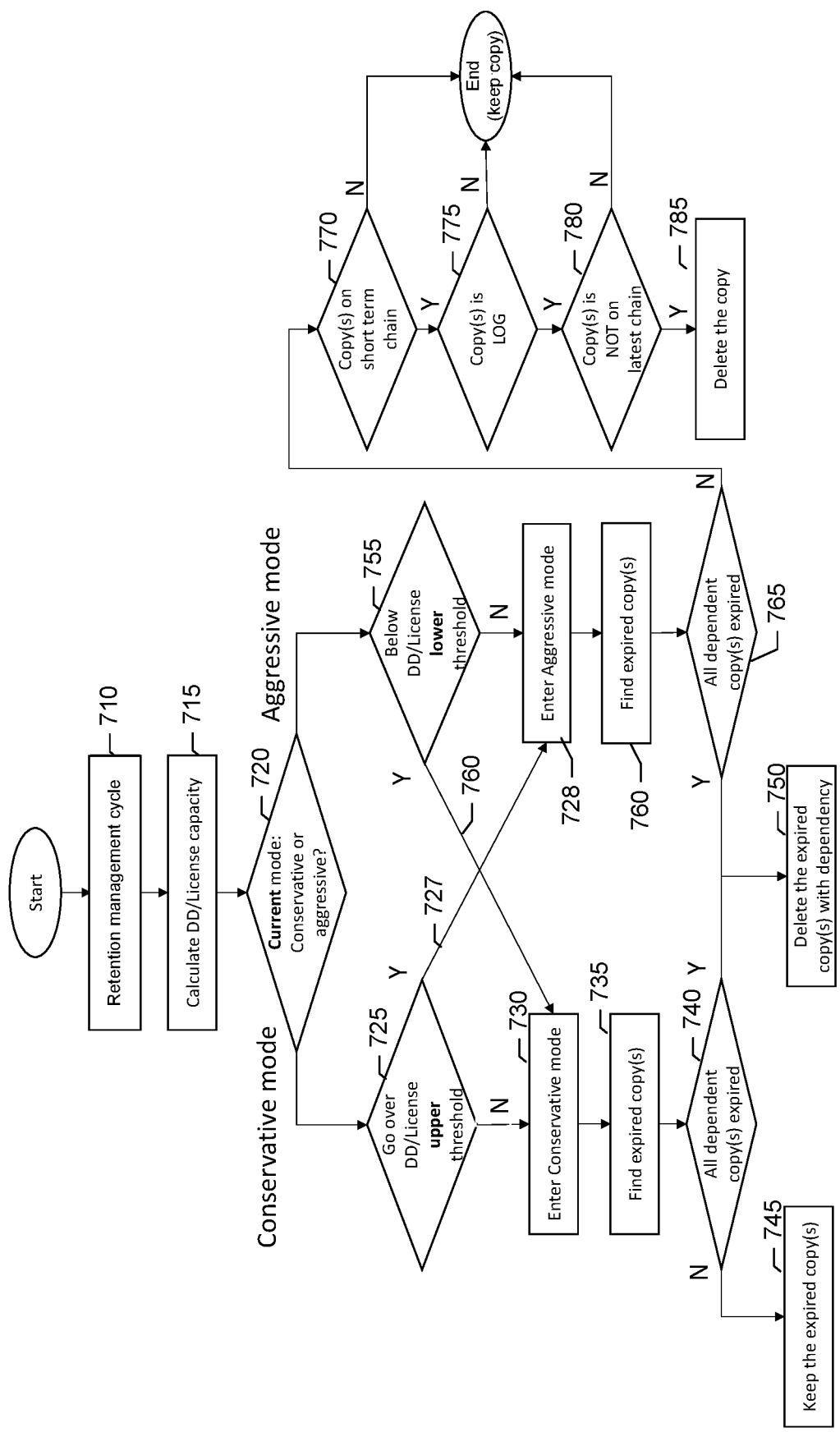
FIG. 7 shows an overall flow for self-adaptive copy retention management, according to one or more embodiments.

FIG. 7 shows an overall flow for intelligent retention management. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 710, a retention management cycle is started. A retention management cycle may be configured to execute on-demand or periodically such as daily, weekly, or at any other frequency as desired. In a step 715, calculations are performed to obtain an amount of storage space capacity being used on the backup storage system including an amount of available space or capacity licensed by the customer organization. In a step 720, a retention mode at which the retention manager is currently operating in is identified. As discussed, the retention manager may be operating in one of a conservative mode or an aggressive mode. During the conservative mode, a copy that has expired but has one or more other dependent copies that have not yet expired is maintained, e.g., not deleted or removed. In other words, the copy is deleted only after all dependent copies have also expired.

If the current retention mode is identified as being in the conservative mode, in a step 725, a determination or check is made as to whether the used space has exceeded an upper threshold of storage or licensed capacity. If the used space has exceeded the upper threshold, the retention manager switches 727 from the conservative mode and into the aggressive mode (step 728).

Alternatively, if the used space has not exceeded the upper threshold, in a step 730, the retention manager enters or otherwise remains in the conservative mode. In a step 735, the retention manager finds or locates copies that have expired. In a step 740, a determination is made as to whether all dependent copies have also expired. The retention manager may, for example, consult, examine, or traverse the index, backup catalog, or other metadata structure to identify a copy type of a particular copy, obtain a retention time of the particular copy, and identify other copies dependent on the particular copy.

If all dependent copies have not expired, in a step 745, the expired copies are kept or retained. Alternatively, if all the dependent copies have also expired, in a step 750, the expired copies are deleted from storage.

Consider, as an example, the copy types and dependencies as shown in FIG. 3, used storage is at 60 percent capacity, an upper threshold capacity is defined as being at or above 90 percent capacity (step 715, FIG. 7), and the current retention mode is identified as conservative (step 720, FIG. 7). As shown in the example of FIG. 3, log 2 325B depends on log 1 325A. Assume that log 1 325A has expired, but that log 2 325B has not yet expired. According to the flow shown in FIG. 7, the retention manager remains in the conservative mode because the 60 percent used storage capacity is below the upper threshold of 90 percent (see, e.g., steps 725 and 730). Log 1 325A, though expired, is retained because log 2 325B which depends on log 1 325A has not yet expired (see, e.g., steps 735, 740, and 745). If, however, log 2 325B has expired, both log 1 325A and log 2 325B may be deleted (see, e.g., step 750).

Referring back now to step 720, if the current retention mode is identified as being in the aggressive mode, in a step 755, a determination or check is made as to whether the used space is below a lower threshold of storage or licensed capacity. If the used space is below the lower threshold, the retention manager switches 760 from the aggressive mode and into the conservative mode (step 730).

Alternatively, if the used space is above the lower threshold, the retention manager enters or otherwise remains in the aggressive mode (step 728). In a step 760, the retention manager finds or locates copies that have expired. In a step 765, a determination is made as to whether all dependent copies have also expired. Steps 760 and 765 are similar to steps 735 and 740, respectively, and discussed above. If all dependent copies have also expired, the expired copies are deleted from storage (step 750).

During the aggressive retention mode, however, if there are copies not yet expired and dependent on the expired copy, the expired copy may be deleted regardless so long as a certain set of conditions are satisfied. In particular, a first condition is satisfied when the expired copy is part of a copy chain having a shortest term of retention (step 770). A second condition is satisfied when the expired copy is of a log copy type (step 775). A third condition is satisfied when the expired copy is not part of a copy chain designated as being a latest copy chain (step 780).

In a step 785, when each of the first, second, and third conditions have been satisfied, the expired copy is deleted. That is, the expired copy may be deleted even if there are other non-expired copies that depend on the expired copy. Some benefits of the retention algorithm shown in FIG. 7 include being able to be easily understood by the customer organization; a self-adaptation retention management mechanism (e.g., does not require or reduces manual user intervention); frees a large amount of storage or license capacity space; unrestorable copies are under control; no impact to the recovery point (RPO); no impact to the long term historical data for regulation purposes to retrieve; only a log copy may be broken, but there can still be a cumulative or differential copy which can include assembled data of the log copy. In an embodiment, systems and techniques are provided to apply the aggressive retention time management to copy(s) chain with short term retention, apply aggressive retention time management to log copies on the selected chain, to not apply the aggressive retention time management on the latest copy(s) chain, and to switch between aggressive retention time management and conservative retention time management based on storage or license usage thresholds.

Figure 8:
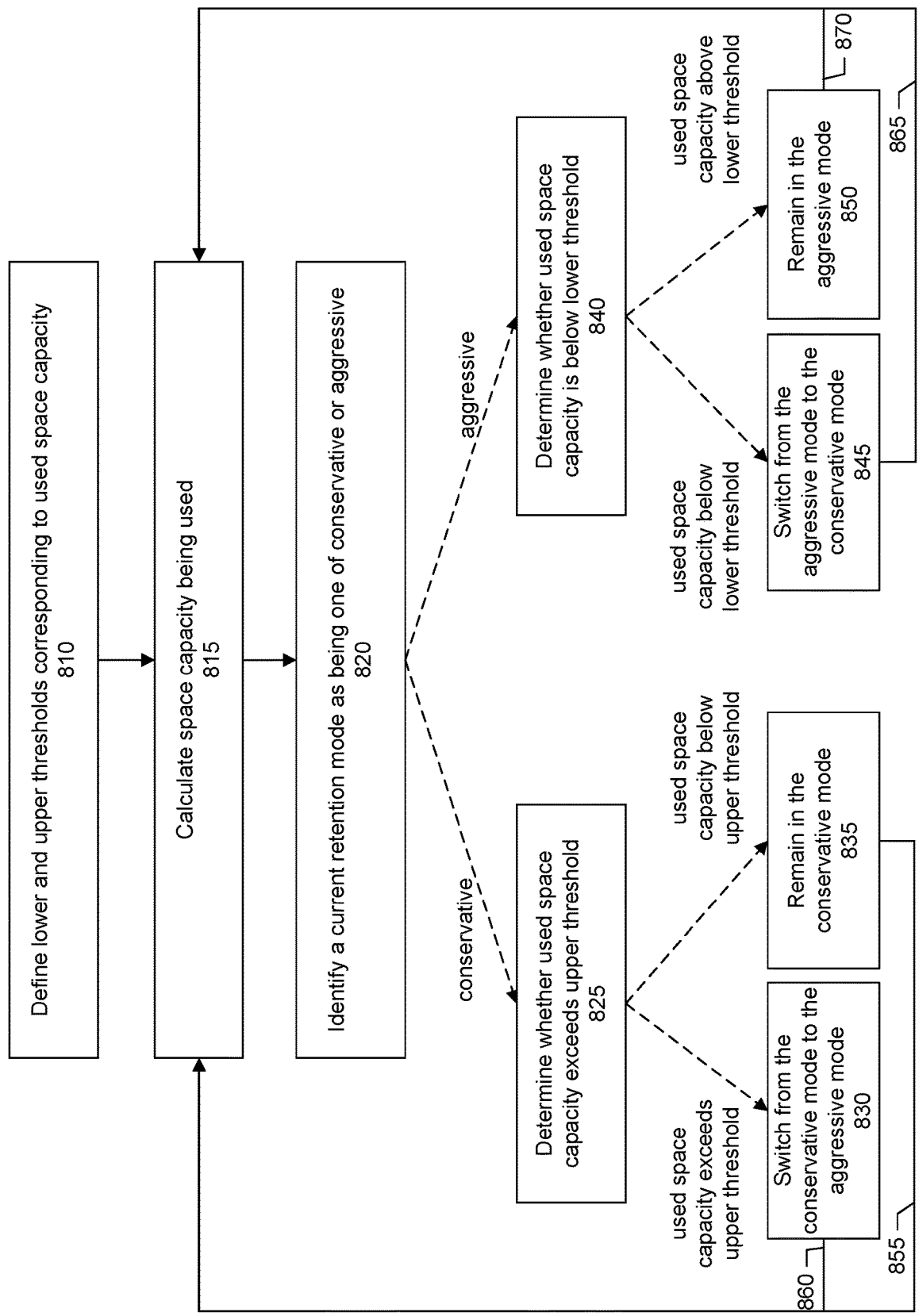
FIG. 8 shows another flow for self-adaptive copy retention management, according to one or more embodiments.

FIG. 8 shows another flow diagram for intelligent and adaptive copy retention management according to one or more embodiments. In a step 810, lower and upper thresholds corresponding to used space capacity are defined. In a step 815, space capacity being used is calculated. In a step 820, a current retention mode is identified as being one of conservative or aggressive.

When the current retention mode is identified as being conservative, in a step 825, a determination is made as to whether the used space capacity exceeds the upper threshold. If the used space capacity exceeds the upper threshold, in a step 830, the retention manager switches from the conservative mode to the aggressive mode. If, however, the used space capacity is below the upper threshold, in a step 835, the retention manager remains in the conservative mode.

When the current retention mode is identified as being aggressive, in a step 840, a determination is made as to whether the used space capacity is below the lower threshold. If the used space capacity is below the lower threshold, in a step 845, the retention manager switches from the aggressive mode to the conservative mode. If, however, the used space capacity is above the lower threshold, the retention manager remains in the aggressive mode. Arrows 855-870 indicate the continuous monitoring of the storage system and self-adaptation of the retention manager. In particular, once a retention management cycle has ended, a new retention management cycle can automatically be triggered to make a new assessment of space on the storage system.

As discussed, generally, when a large amount of space is available, the retention manager enters the conservative mode thereby increasing the number of copies maintained and thus recovery point options. When a small amount of space is available, the retention manager enters the aggressive mode thereby helping to free space for new backup copies and remain within capacity licensing agreements. In other words, the retention manager can take advantage of space when available to maintain many different copies and thus provide many different recovery points. When, however, space is limited the retention manager aggressively deletes copies to free space for new backup copies and remain within licensed capacity.

Figure 9:
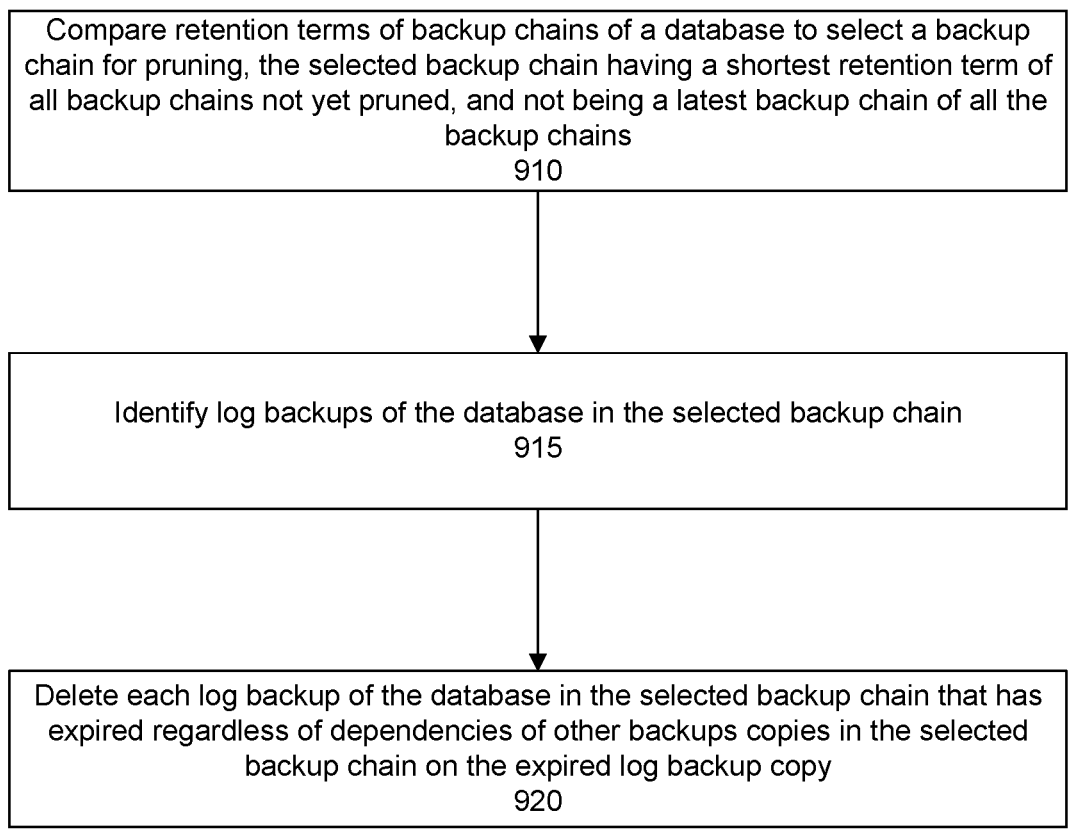
FIG. 9 shows a flow for aggressive copy retention management, according to one or more embodiments.

FIG. 9 shows a flow for the aggressive retention mode. In a step 910, retention terms of backup chains of a database are compared to each other to select a backup chain for pruning, the selected backup chain having a shortest retention term of all backup chains not yet pruned, and not being a latest backup chain of all the backup chains.

In a step 915, log backups of the database from the selected backup chain are identified and selected. In a step 920, each log backup of the database in the selected backup chain that has expired is deleted—regardless of dependencies of other backup copies on the expired log backup copy. While deleting expired log backups can break the log copy chain and reduce the number of recovery points in a particular backup chain, there can still be a good number of other recovery paths and points in the particular backup chain. That is, limiting the deletions to the log copy types helps to preserve other recovery paths through other copies and copy types.

For example, referring back now to FIG. 3, consider as an example, that log 1 325A has expired and is deleted under an aggressive retention management mode. Log 2 325B, dependent on log 1 325A, has not expired and is thus not deleted. A restore path from log 2 to log 1 to full 1 is broken. However, there still exist other restore paths in the backup chain. For example, log 2 can be restored from differential 1 315A. As another example, log 3 325C can be restored from differential 2 315B. Log 4 325D can be restored from log 3 325C which, as discussed, can be restored from differential 2. As another example, a recovery can be made by applying differential 1 to full 1. A recovery can be made by applying differential 2 to differential 1 to full 1. A recovery can be made by applying cumulative 1 to full 1. A recovery can be made by applying differential 3 to cumulative 1 to full 1. A recovery can be made by applying differential 4 to differential 3 to cumulative 1 to full 1, and so forth.

In an embodiment, there is a method of managing copy retention for backups of a database comprising: identifying a current retention mode as being one of a conservative mode or an aggressive mode; when the current retention mode is identified as the aggressive mode, checking whether used space on backup storage is below a lower threshold; if the used space is below the lower threshold, switching into the conservative mode; if the used space is above the lower threshold, remaining in the aggressive mode; and while in the aggressive mode, selecting a backup chain of the database for pruning, the selected backup chain having a shortest retention term of all backup chains of the database not yet pruned, and not being a latest backup chain of all the backup chains; identifying log backups of the database in the selected backup chain; and deleting each log backup of the database in the selected backup chain that has expired regardless of dependency of other backups on an expired log backup.

The method may include repeating the selecting a backup chain for pruning, identifying log backups, and deleting each expired log backup regardless of dependency until the used space capacity is below the lower threshold.

The method may include when the current retention mode is identified as the conservative mode, checking whether used space capacity on the backup storage is above an upper threshold, greater than the lower threshold; if the used space capacity is above the upper threshold, switching from the conservative mode into the aggressive mode; and upon the switching into the aggressive mode, performing the selecting a backup chain for pruning, identifying log backups, and deleting each expired log backup regardless of dependency.

The method may include upon switching into the conservative mode, maintaining an expired log backup until all other log backups dependent on the expired log backup have also expired. In an embodiment, the selected backup chain of the database comprises a single full backup of the database, and a plurality of partial backups of the database.

In an embodiment, the selecting a backup chain further comprises: comparing a first retention term of a first backup chain to a second retention term of a second backup chain; determining that the first retention term is less than the second retention term; and selecting the first backup chain for pruning, the first backup chain thereby being the selected backup chain.

In another embodiment, there is a system for managing copy retention for backups of a database, the system comprising: a processor; and memory configured to store one or more sequences of instructions which, when executed by the processor, cause the processor to carry out the steps of: identifying a current retention mode as being one of a conservative mode or an aggressive mode; when the current retention mode is identified as the aggressive mode, checking whether used space on backup storage is below a lower threshold; if the used space is below the lower threshold, switching into the conservative mode; if the used space is above the lower threshold, remaining in the aggressive mode; and while in the aggressive mode, selecting a backup chain of the database for pruning, the selected backup chain having a shortest retention term of all backup chains of the database not yet pruned, and not being a latest backup chain of all the backup chains; identifying log backups of the database in the selected backup chain; and deleting each log backup of the database in the selected backup chain that has expired regardless of dependency of other backups on an expired log backup.

In another embodiment, there is a computer program product, comprising a non-transitory computer-readable medium having a computer-readable program code embodied therein, the computer-readable program code adapted to be executed by one or more processors to implement a method for managing copy retention for backups of a database, the method comprising: identifying a current retention mode as being one of a conservative mode or an aggressive mode; when the current retention mode is identified as the aggressive mode, checking whether used space on backup storage is below a lower threshold; if the used space is below the lower threshold, switching into the conservative mode; if the used space is above the lower threshold, remaining in the aggressive mode; and while in the aggressive mode, selecting a backup chain of the database for pruning, the selected backup chain having a shortest retention term of all backup chains of the database not yet pruned, and not being a latest backup chain of all the backup chains; identifying log backups of the database in the selected backup chain; and deleting each log backup of the database in the selected backup chain that has expired regardless of dependency of other backups on an expired log backup.

Figure 10:
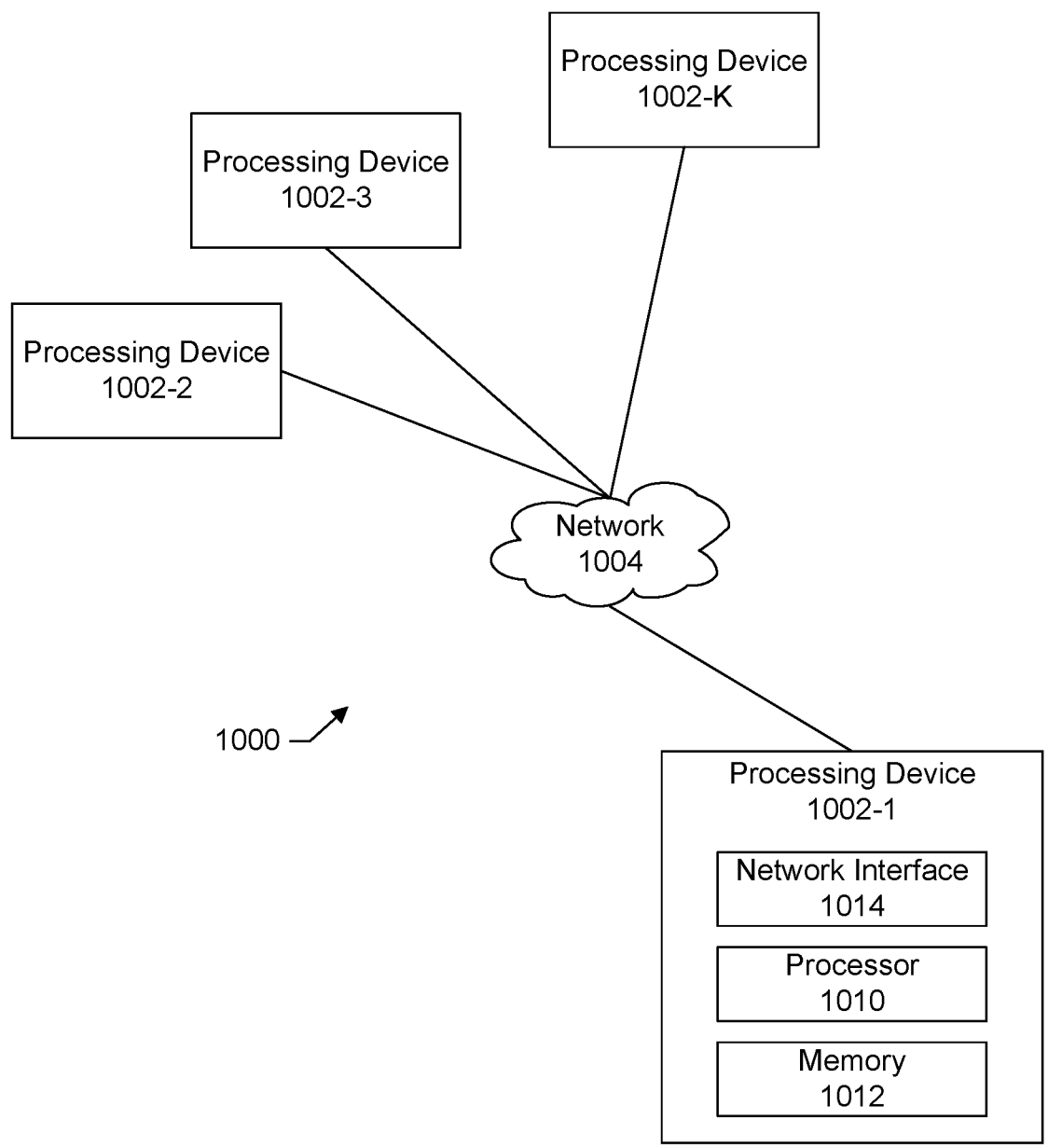
FIG. 10 shows a block diagram of a processing platform that may be utilized to implement at least a portion of an information processing system, according to one or more embodiments.

FIG. 10 shows an example of a processing platform 1000 that may include at least a portion of the information handling system shown in FIG. 1. The example shown in FIG. 10 includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 11:
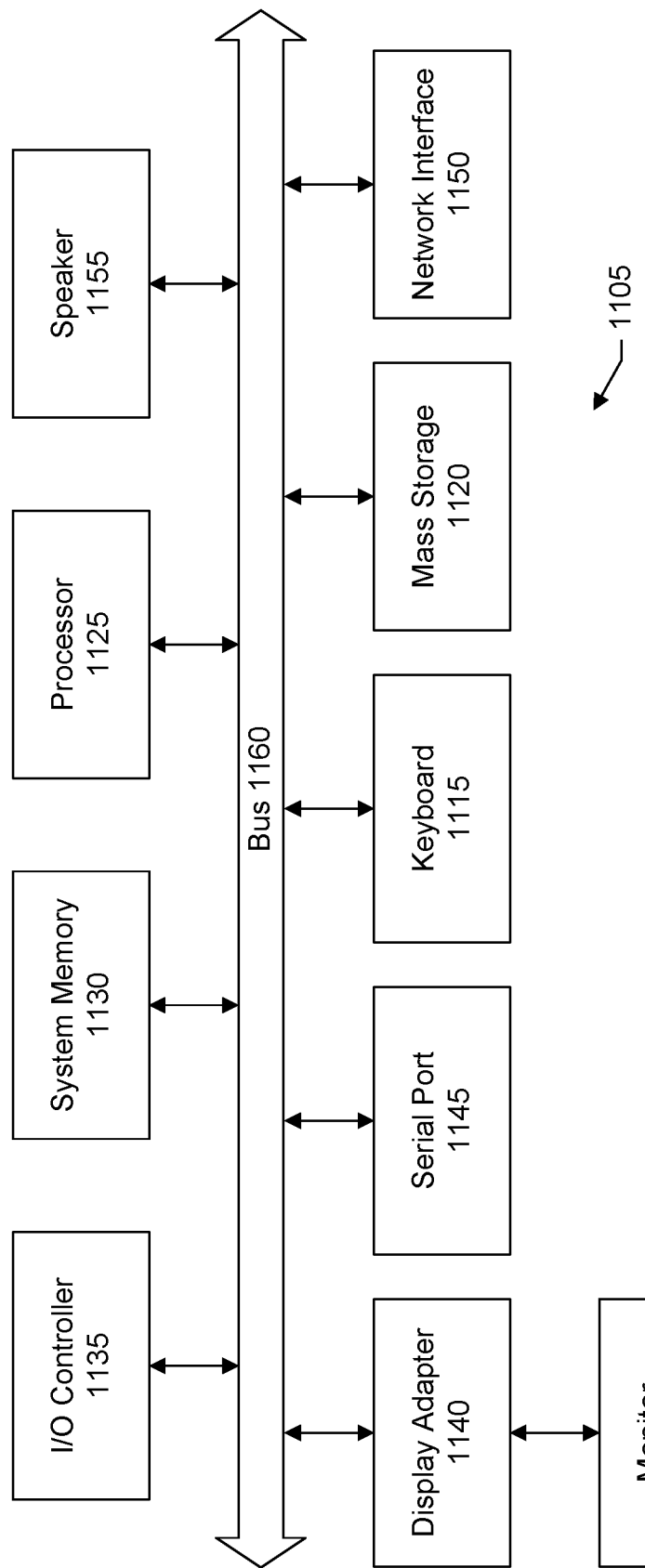
FIG. 11 shows a block diagram of a computer system suitable for use with the system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of managing copy retention for backups of a database comprising:
    identifying a current retention mode as being one of a conservative mode or an aggressive mode, wherein the conservative mode preserves expired backup copies on which an unexpired backup copy depends, and the aggressive mode deletes the expired backup copies on which the unexpired backup copy depends when a plurality of conditions are satisfied;
    when the current retention mode is identified as the aggressive mode, checking whether used space on backup storage is below a lower threshold;
    when the used space is below the lower threshold, switching into the conservative mode;
    when the used space is above the lower threshold, remaining in the aggressive mode; and
    while in the aggressive mode, selecting a backup chain of the database for pruning, the selected backup chain having a shortest retention term of all backup chains of the database not yet pruned, and not being a latest backup chain of all the backup chains;
    identifying log backups of the database in the selected backup chain, the log backups comprising a log file of transactions issued by a client, the transactions having been written from memory to the log file and then committed to the database; and
    deleting each log backup of the database in the selected backup chain that has expired regardless of dependency of other backups on an expired log backup.

2. The method of claim 1 further comprising:
    repeating the selecting a backup chain for pruning, identifying log backups, and deleting each expired log backup regardless of dependency until the used space capacity is below the lower threshold.

3. The method of claim 1 further comprising:
    when the current retention mode is identified as the conservative mode, checking whether used space capacity on the backup storage is above an upper threshold, greater than the lower threshold;
    when the used space capacity is above the upper threshold, switching from the conservative mode into the aggressive mode; and
    upon the switching into the aggressive mode, performing the selecting a backup chain for pruning, identifying log backups, and deleting each expired log backup regardless of dependency.

4. The method of claim 1 further comprising:
    upon switching into the conservative mode, maintaining an expired log backup until all other log backups dependent on the expired log backup have also expired.

5. The method of claim 1 wherein the selected backup chain of the database comprises a single full backup of the database, and a plurality of partial backups of the database.

6. The method of claim 1 wherein the selecting a backup chain further comprises:
  comparing a first retention term of a first backup chain to a second retention term of a second backup chain;
  determining that the first retention term is less than the second retention term; and
  selecting the first backup chain for pruning, the first backup chain thereby being the selected backup chain.

7. A system for managing copy retention for backups of a database, the system comprising: a processor; and memory configured to store one or more sequences of instructions which, when executed by the processor, cause the processor to carry out the steps of:
  identifying a current retention mode as being one of a conservative mode or an aggressive mode, wherein the conservative mode preserves expired backup copies on which an unexpired backup depends, and the aggressive mode deletes the expired backup copies on which the unexpired backup copy depends when a plurality of conditions are satisfied;
  when the current retention mode is identified as the aggressive mode, checking whether used space on backup storage is below a lower threshold;
  when the used space is below the lower threshold, switching into the conservative mode;
  when the used space is above the lower threshold, remaining in the aggressive mode; and
  while in the aggressive mode, selecting a backup chain of the database for pruning, the selected backup chain having a shortest retention term of all backup chains of the database not yet pruned, and not being a latest backup chain of all the backup chains;
  identifying log backups of the database in the selected backup chain, the log backups comprising a log file of transactions issued by a client, the transactions having been written from memory to the log file and then committed to the database; and
  deleting each log backup of the database in the selected backup chain that has expired regardless of dependency of other backups on an expired log backup.

8. The system of claim 7 wherein the processor further carries out the steps of:
  repeating the selecting a backup chain for pruning, identifying log backups, and deleting each expired log backup regardless of dependency until the used space capacity is below the lower threshold.

9. The system of claim 7 wherein the processor further carries out the steps of:
  when the current retention mode is identified as the conservative mode, checking whether used space capacity on the backup storage is above an upper threshold, greater than the lower threshold;
  when the used space capacity is above the upper threshold, switching from the conservative mode into the aggressive mode; and
  upon the switching into the aggressive mode, performing the selecting a backup chain for pruning, identifying log backups, and deleting each expired log backup regardless of dependency.

10. The system of claim 7 wherein the processor further carries out the steps of:
  upon switching into the conservative mode, maintaining an expired log backup until all other log backups dependent on the expired log backup have also expired.

11. The system of claim 7 wherein the selected backup chain of the database comprises a single full backup of the database, and a plurality of partial backups of the database.

12. The system of claim 7 wherein the selecting a backup chain further comprises:
  comparing a first retention term of a first backup chain to a second retention term of a second backup chain;
  determining that the first retention term is less than the second retention term; and
  selecting the first backup chain for pruning, the first backup chain thereby being the selected backup chain.

13. A computer program product, comprising a non-transitory computer-readable medium having a computer-readable program code embodied therein, the computer-readable program code adapted to be executed by one or more processors to implement a method for managing copy retention for backups of a database, the method comprising:
  identifying a current retention mode as being one of a conservative mode or an aggressive mode, wherein the conservative mode preserves expired backup copies on which an unexpired backup copy depends, and the aggressive mode deletes the expired backup copies on which the unexpired backup copy depends when a plurality of conditions are satisfied;
  when the current retention mode is identified as the aggressive mode, checking whether used space on backup storage is below a lower threshold;
  when the used space is below the lower threshold, switching into the conservative mode;
  when the used space is above the lower threshold, remaining in the aggressive mode; and
  while in the aggressive mode, selecting a backup chain of the database for pruning, the selected backup chain having a shortest retention term of all backup chains of the database not yet pruned, and not being a latest backup chain of all the backup chains;
  identifying log backups of the database in the selected backup chain, the log backups comprising a log file of transactions issued by a client, the transactions having been written from memory to the log file and then committed to the database; and
  deleting each log backup of the database in the selected backup chain that has expired regardless of dependency of other backups on an expired log backup.

14. The computer program product of claim 13 wherein the method further comprises:
  repeating the selecting a backup chain for pruning, identifying log backups, and deleting each expired log backup regardless of dependency until the used space capacity is below the lower threshold.

15. The computer program product of claim 13 wherein the method further comprises:
  when the current retention mode is identified as the conservative mode, checking whether used space capacity on the backup storage is above an upper threshold, greater than the lower threshold;
  when the used space capacity is above the upper threshold, switching from the conservative mode into the aggressive mode; and
  upon the switching into the aggressive mode, performing the selecting a backup chain for pruning, identifying log backups, and deleting each expired log backup regardless of dependency.

16. The computer program product of claim 13 wherein the method further comprises:
  upon switching into the conservative mode, maintaining an expired log backup until all other log backups dependent on the expired log backup have also expired.

17. The computer program product of claim 13 wherein the selected backup chain of the database comprises a single full backup of the database, and a plurality of partial backups of the database.

18. The computer program product of claim 13 wherein the selecting a backup chain further comprises:
   comparing a first retention term of a first backup chain to a second retention term of a second backup chain;
   determining that the first retention term is less than the second retention term; and
   selecting the first backup chain for pruning, the first backup chain thereby being the selected backup chain.

\* \* \* \* \*